US012760877B2

(12) United States Patent
Shiffler

(10) Patent No.: US 12,760,877 B2
(45) Date of Patent: Oct. 13, 2026

(54) PERSONAL CAMERA AND VIDEOGRAPHY LIGHT

(71) Applicant: Michael the Maven, LLC, Sheridan, WY (US)

(72) Inventor: Michael Shiffler, Sheridan, WY (US)

(73) Assignee: MICHAEL THE MAVEN, LLC, Sheridan, WY (US)

( * ) Notice: Subject to any disclaimer, the term of this patent is extended or adjusted under 35 U.S.C. 154(b) by 0 days.

(21) Appl. No.: 18/417,931

(22) Filed: Jan. 19, 2024

(65) Prior Publication Data

US 2024/0247789 A1 Jul. 25, 2024

Related U.S. Application Data

(60) Provisional application No. 63/440,339, filed on Jan. 20, 2023.

(51) Int. Cl.

| | |
|---|---|
| ***F21V 21/28*** | (2006.01) |
| ***F21V 21/30*** | (2006.01) |
| ***F21V 23/04*** | (2006.01) |
| *F21Y 103/10* | (2016.01) |
| *F21Y 113/00* | (2016.01) |
| *F21Y 115/10* | (2016.01) |
| *H04N 23/56* | (2023.01) |

(52) U.S. Cl.

CPC .............. *F21V 21/28* (2013.01); *F21V 21/30* (2013.01); *F21V 23/04* (2013.01); *F21Y 2103/10* (2016.08); *F21Y 2113/00* (2013.01); *F21Y 2115/10* (2016.08); *H04N 23/56* (2023.01)

(58) Field of Classification Search

CPC ........... F21V 21/28; F21V 21/30; F21V 23/04

See application file for complete search history.

(56) References Cited

U.S. PATENT DOCUMENTS

| | | | | |
|---|---|---|---|---|
| 5,595,441 A * | 1/1997 | McGee | F21L 4/04 | 362/240 |
| 8,072,123 B1 * | 12/2011 | Han | F21K 9/65 | 313/45 |
| 2007/0097689 A1 * | 5/2007 | Barausky | F21S 6/003 | 362/410 |
| 2011/0051437 A1 * | 3/2011 | Ng | F21S 6/003 | 362/418 |
| 2013/0335996 A1 * | 12/2013 | Yao | F21V 21/06 | 362/581 |
| 2014/0078724 A1 * | 3/2014 | Bendit | F21V 21/30 | 362/184 |
| 2016/0356439 A1 * | 12/2016 | Inskeep | F21V 21/30 | |
| 2018/0238523 A1 * | 8/2018 | Hudson | G03B 15/02 | |
| 2021/0108782 A1 * | 4/2021 | Todd | H01R 33/94 | |

* cited by examiner

*Primary Examiner* — Evan P Dzierzynski
*Assistant Examiner* — Nathaniel J Lee
(74) *Attorney, Agent, or Firm* — Travis Banta; Ascent IP Law

(57) ABSTRACT

A light device includes one or more light arms. The light arms are rotatable and extendable. The light arms rotate based on a rotation hinge which connects the housing to the one or more light arms. The light arms extend by an extension hinge disposed between a first portion and a second portion of the light arms. The light arms may include a plurality of light elements which emit light for photography and videography purposes.

14 Claims, 5 Drawing Sheets

PERSONAL CAMERA AND VIDEOGRAPHY LIGHT

PRIORITY CLAIM

This application claims the benefit of and priority to U.S. Provisional Patent Application 63/440,339, filed on Jan. 20, 2023.

TECHNICAL FIELD

The disclosure relates generally to systems and devices related to a personal camera and videography light. The light may include folding and extendible arms.

BACKGROUND

Until the recent modern past, mankind relied on two sources for light—celestial objects, and fire. The sun, moon, and stars provided light which was essential to human life on earth. Light was used for travel, hunting, making shelters, and all the foundational acts of human life. After mankind discovered fire, light became a possibility in any location where spark and fuel could be provided.

Surprisingly, light from the sun, moon, stars, and fire encompassed virtually all light available to humans on earth until the discovery of electricity and the harnessing of electricity to be a source of power in the early 1800s. Various fuels were used to create lamps, including olive oil, whale oil, kerosene, and others, which were the fundamental unit of light. Arc lamps created light by allowing electricity to flow from an anode to a cathode, in a somewhat dangerous implementation until Thomas Edison created a light bulb in the 1880s. Thus, electric light is a relatively recent invention on the scale of the existence of humanity.

Electric light, especially after the invention of the light bulb, spread quickly as the ability to have a quality light source which was significantly safer not only became desirable but also became highly desirable. Electric lines were run from electrical generators into cities to supply electrical power to buildings in cities, principally to provide light.

While cameras predated electric light, electric light improved camera picture quality. Flash bulbs provided brief pulses of light in places where the light was too poor to take a quality picture. Cameras principally work by collecting light which reflects off a picture subject and, because of that, the amount of light available for the picture changes the quality of the picture. Typically, more light creates a better picture than would be created if less light were used to take the same picture. For this reason, many diverse types of electric lights have been invented for the purpose of improving photography.

Today's camera studios and videography production studios typically include electric lights of all kinds to produce an extremely high picture quality. These camera studios and videography production studios have required such expensive equipment that such studios were only available to well-funded entities such as companies that made movies, or some local news channels. However, as the quality of camera equipment improved, the expense of high quality camera equipment decreased, making such equipment something that is generally affordable for individuals. Further, the advent of social media has generated a forum for individuals to create pictures and video for consumption by an audience without having to go through conventional media providers. Thus, demand for camera equipment, video equipment, sound equipment, lighting equipment, and other equipment has rapidly increased to allow people to make their voices heard through avenues like social media.

It is therefore one object of this disclosure to provide a light for illuminating a scene for a picture by a camera or for a video recorded by a camera. It is an object of this disclosure to provide a modular and portable light to reduce the necessary size of the light. It is another object of this disclosure to provide a light which includes fold down and extendable arms for increasing an area in which light can be radiated.

SUMMARY

Disclosed herein is a light device includes one or more light arms. The light arms are rotatable and extendable. The light arms rotate based on a rotation hinge which connects the housing to the one or more light arms. The light arms extend by an extension hinge disposed between a first portion and a second portion of the light arms. The light arms may include a plurality of light elements which emit light for photography and videography purposes.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings.

DETAILED DESCRIPTION

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same or similar reference numbers are used throughout the drawings to refer to the same or similar parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
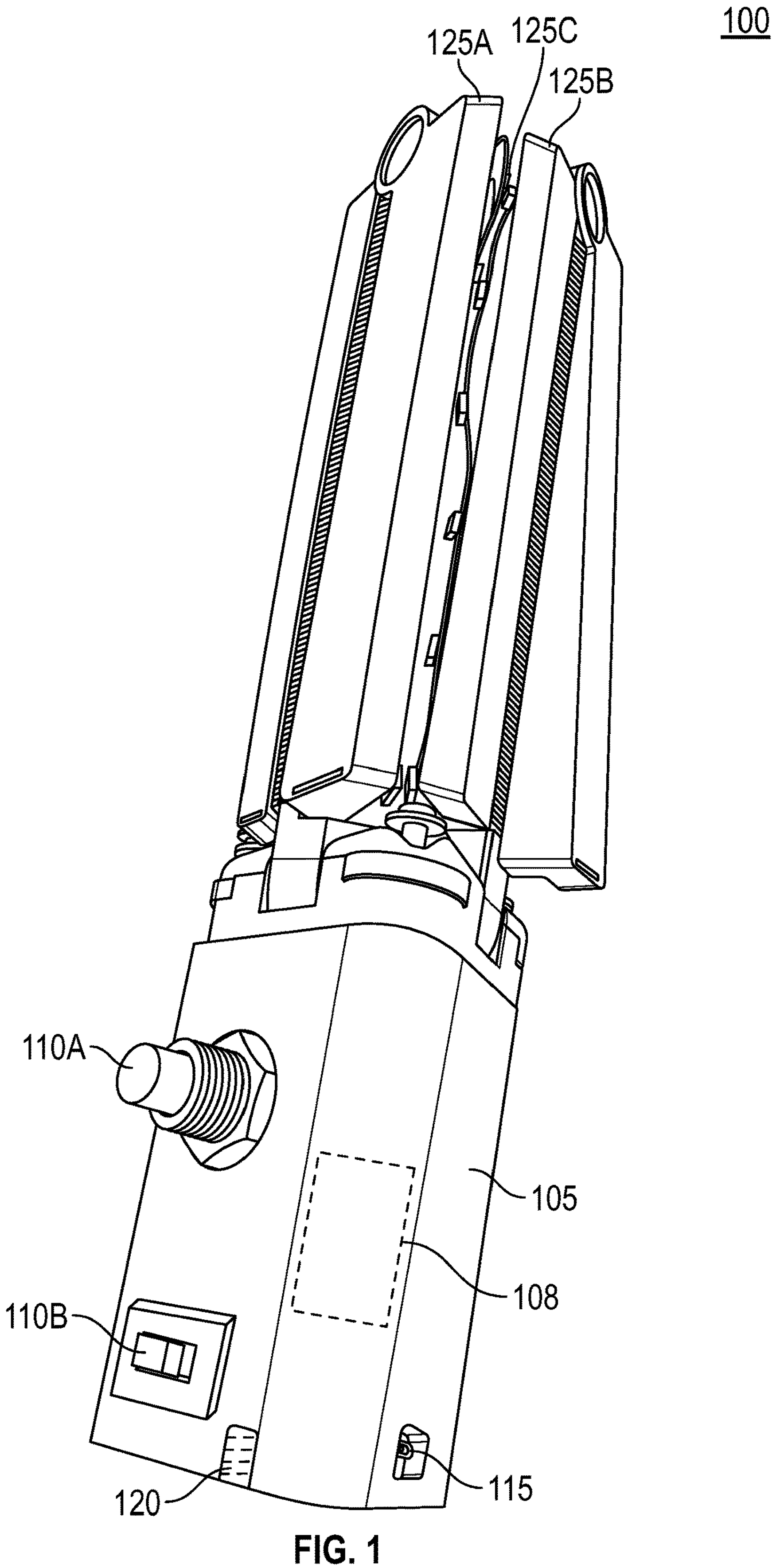
FIG. 1 illustrates a perspective view of a light device.

FIG. 1 illustrates a perspective view of a light device 100. Light device 100 includes a housing 105 within which a battery 108 may be disposed. Battery 108 may provide power to lights installed within light device 100, as will be discussed below. Housing 105 may include control switches, such as control switch 110A and control switch 110B. As shown in FIG. 1, control switch 110A and 110B are separate and discrete elements. For example, control switch 110A may be a light dimming switch while control switch 110B may be a power switch which turns the lights on and off. However, control switches 110A and 110B are merely exemplary as a single control switch may control both dimming functionality and power on/off functionality. Thus, a control switch may operate one or both of a dimming functionality and a power functionality.

FIG. 1 further illustrates connection circuitry 115. Connection circuitry 115 is illustrated as a wired electrical connection, such as a universal serial bus port which both receives informational signals and power to charge battery 108. However, connection circuitry 115 may include circuitry which connects wirelessly with other devices, such as a mobile phone, laptop, or any other smart device that includes a processor with sufficient power to send and receive wireless signals. Connection circuitry 115 may allow, for example, light device 100 to receive a command from, for example, a smart phone, tablet, or other smart device, which causes light device 100 to turn on or off or to dim or brighten lights in light device 100. Housing 105 may further include a mount 120 for attaching light device 100 to a tripod.

Housing 105 in light device 100 may be connected to a plurality of light arms 125A, 125B, and 125C. As shown in FIG. 1, three light arms 125A, 125B, and 125C are illustrated although more or fewer light arms may be implemented. For example, light device 100 may include a single light arm, two light arms disposed opposite of each other, three light arms as shown in FIG. 1, four light arms, five light arms, six light arms, seven light arms, or a plurality of light arms. Light arms 125A-C, as will be discussed below, include a first portion and a second portion where the second portion may form an extension of the first portion of the light arm. Further, each one of light arms 125A-C may include a plurality of individual light elements, implemented as light emitting diodes ("LEDs") which emit light from light device 100.

Figure 2:
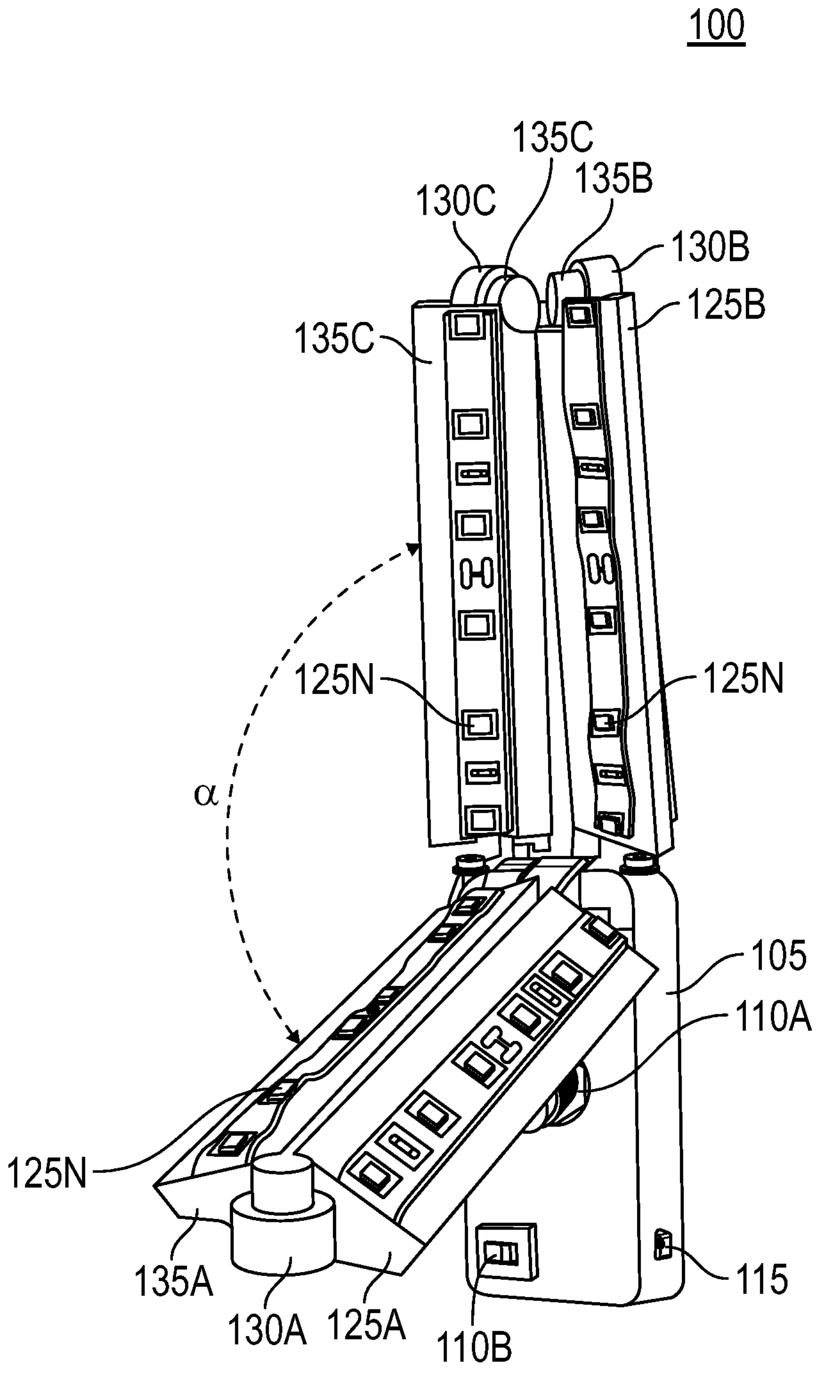
FIG. 2 illustrates a perspective view of a light device with a first light arm rotated into a first position.

FIG. 2 illustrates a perspective view of a light device 100 with a first light arm 125A rotated into a first position. Light device 100 may be similar to light device 100 shown in FIG. 1, although first light arm 125A in a plurality of light arms, 125A-125C, has been rotated into a first position at an angle α, which is approximately 90 degrees to housing 105 (e.g., forming a right angle or orthogonal angle to housing 105) where approximately 90 degrees means plus or minus 10 degrees. Second light arm 125B, and third light arm 125C remain disposed vertically, as shown in FIG. 2, which is essentially parallel to a length of housing 105. Each one of the plurality of light arms, such as plurality of light arms 125A-125C may be independently rotatable by a rotation hinge, which will be discussed below.

First light arm 125A may include a hinge 130A and a first light arm extension 135A. Both first light arm 125A and first light arm extension 135A may include a plurality of light emitting diodes ("LEDs") 125N which emit light along a length of first light arm 125A and first light arm extension 135A. As shown in FIG. 2, first light arm extension 135A is disposed adjacent to first light arm 125A to provide more intense light over a smaller area. However, as will be discussed below, first light arm 125A may rotate by hinge 130A to be aligned with light arm extension 135A to provide a less intense light over a larger area.

Second light arm 125B also includes a hinge 130B and a second light arm extension 135B. Second light arm 125B and second light arm extension 135B also include a plurality of light emitting diodes ("LEDs") 125N. Second light arm 125B may function in a manner similar to first light arm 125A and may also rotate, as will be described below. Light device 100 may further include a third light arm 125C. Third light arm 125C may also include a hinge 130C and a third light arm extension 135C. Third light arm 125C may also include a plurality of light emitting diodes 125N which emit light according to the position of control switch 110A-B.

Figure 3:
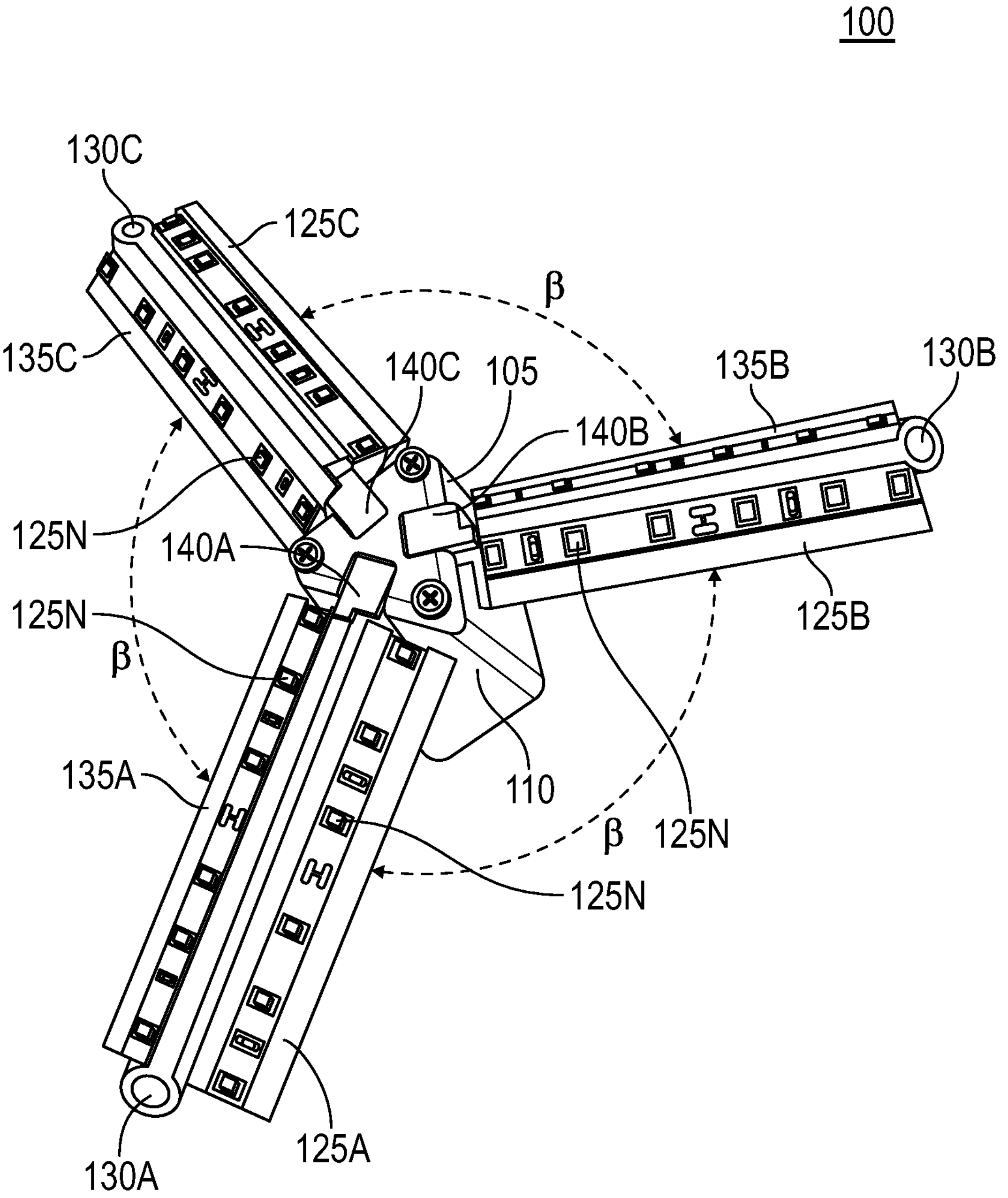
FIG. 3 illustrates a perspective view of a light device with a plurality of light arms rotated into a first position.

FIG. 3 illustrates a perspective view of a light device 100 with a plurality of light arms 125A-125C rotated into a first position by hinges 140A-140C, respectively. Light device 100 may be similar to light device 100 shown in FIG. 1, although the plurality of light arms 125A-125C, have been rotated into a first position at an angle α (shown in FIG. 2), which is approximately 90 degrees to housing 105 (e.g., forming a right angle or orthogonal to housing 105) where approximately 90 degrees means plus or minus 10 degrees. As shown in FIG. 3, each one of light arms 125A-125C are disposed from each other at an equal angle, β, which may be subject to the number of light arms. For example, with three light arms, light arms 125A-125C angle β may be 120 degrees. In an implementation with two light arms, angle β may be 180 degrees. In an implementation with four light arms, angle β may be 90 degrees. Other implementations are possible which will alter corresponding angle β between light arms.

First light arm 125A may include a hinge 130A and a first light arm extension 135A. Both first light arm 125A and first light arm extension 135A may include a plurality of light elements (light emitting diodes ("LEDs")) 125N which emit light along a length of first light arm 125A and first light arm extension 135A. As shown in FIG. 3, first light arm extension 135A is disposed next to first light arm 125A to provide more intense light over a smaller area. However, as will be discussed below, first light arm extension 135A may rotate by hinge 130A to be aligned with light arm 125A to provide a less intense light over a larger area.

Second light arm 125B also includes a hinge 130B and a second light arm extension 135B. Second light arm 125B and second light arm extension 135B also include a plurality of light elements (light emitting diodes ("LEDs")) 125N. Second light arm 125B may function in a manner similar to first light arm 125B and may also rotate, as will be described below. Light device 100 may further include a third light arm 125C. Third light arm 125C may also include a hinge 130C and a third light arm extension 135C. Third light arm 125C may also include a plurality of light emitting diodes 125N which emit light according to the position of control switch 110A-B.

Figure 4:
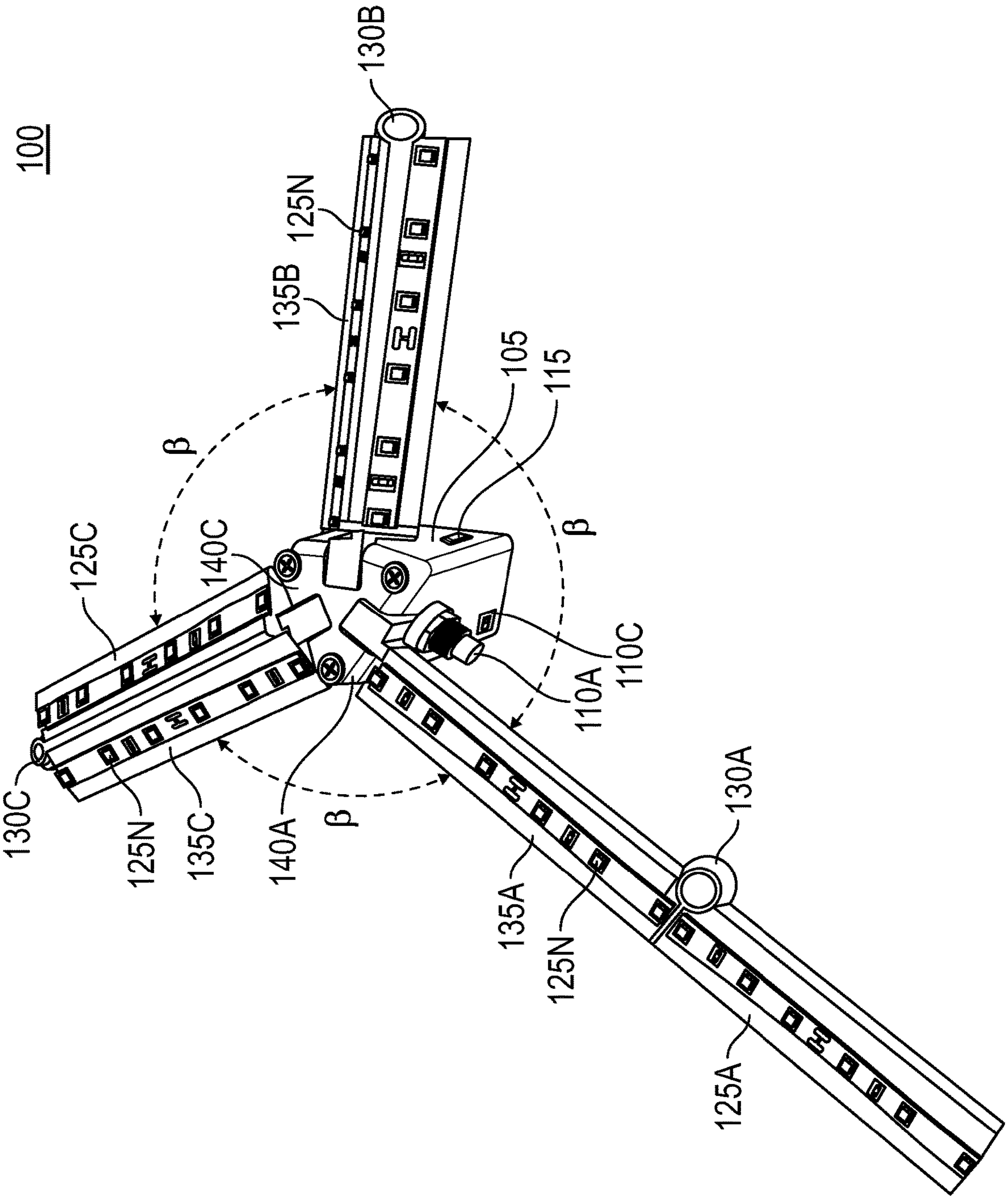
FIG. 4 illustrates a perspective view of a light device with a portion of a first light arm extended into a second position.

FIG. 4 illustrates a perspective view of a light device 100 with a portion of a first light arm 125A extended into a second position. Light device 100 includes a housing 105 and one or more control switch 110A-B. As shown in FIG. 4, each one of light arms 125A-125C have ben rotated down by hinges 140A-140C, respectively, at an angle α, shown in FIG. 3. Light arms 125A-125C are disposed in plane horizontal to a length of housing 105 at an angle, β, from each other which may be subject to the number of light arms implemented by light device 100. For example, with three light arms, light arms 125A-125C angle β may be 120 degrees. In an implementation with two light arms, angle β may be 180 degrees. In an implementation with four light arms, angle β may be 90 degrees. Other implementations are possible which will alter corresponding angle β between light arms.

First light arm 125A may include a hinge 130A and a first light arm extension 135A. Both first light arm 125A and first light arm extension 135A may include a plurality of light elements (light emitting diodes ("LEDs")) 125N which emit light along a length of first light arm 125A and first light arm extension 135A. As shown in FIG. 4, first light arm 125A is in a second position by articulation of extension hinge 130A. First light arm 125A may be articulated by extension hinge 130A to align with first light arm extension 135A to provide light over a larger area than if first light arm 125A was not articulated by hinge 130A. In this manner, a length of a light arm among the plurality of light arms 125A-125C is doubled disposed next to first light arm 125A to provide more intense light over a smaller area (e.g., a length of light arm 125A is effectively doubled by rotating light arm 125A into alignment with first light extension 135A to create a single extended light arm).

Second light arm 125B also includes a hinge 130B and a second light arm extension 135B. Second light arm 125B and second light arm extension 135B also include a plurality of light emitting diodes ("LEDs") 125N. Second light arm 125B may function in a manner similar to first light arm 125B and may also rotate, as will be described below. Light device 100 may further include a third light arm 125C. Third light arm 125C may also include a hinge 130C and a third light arm extension 135C. Third light arm 125C may also include a plurality of light emitting diodes 125N.

Figure 5:
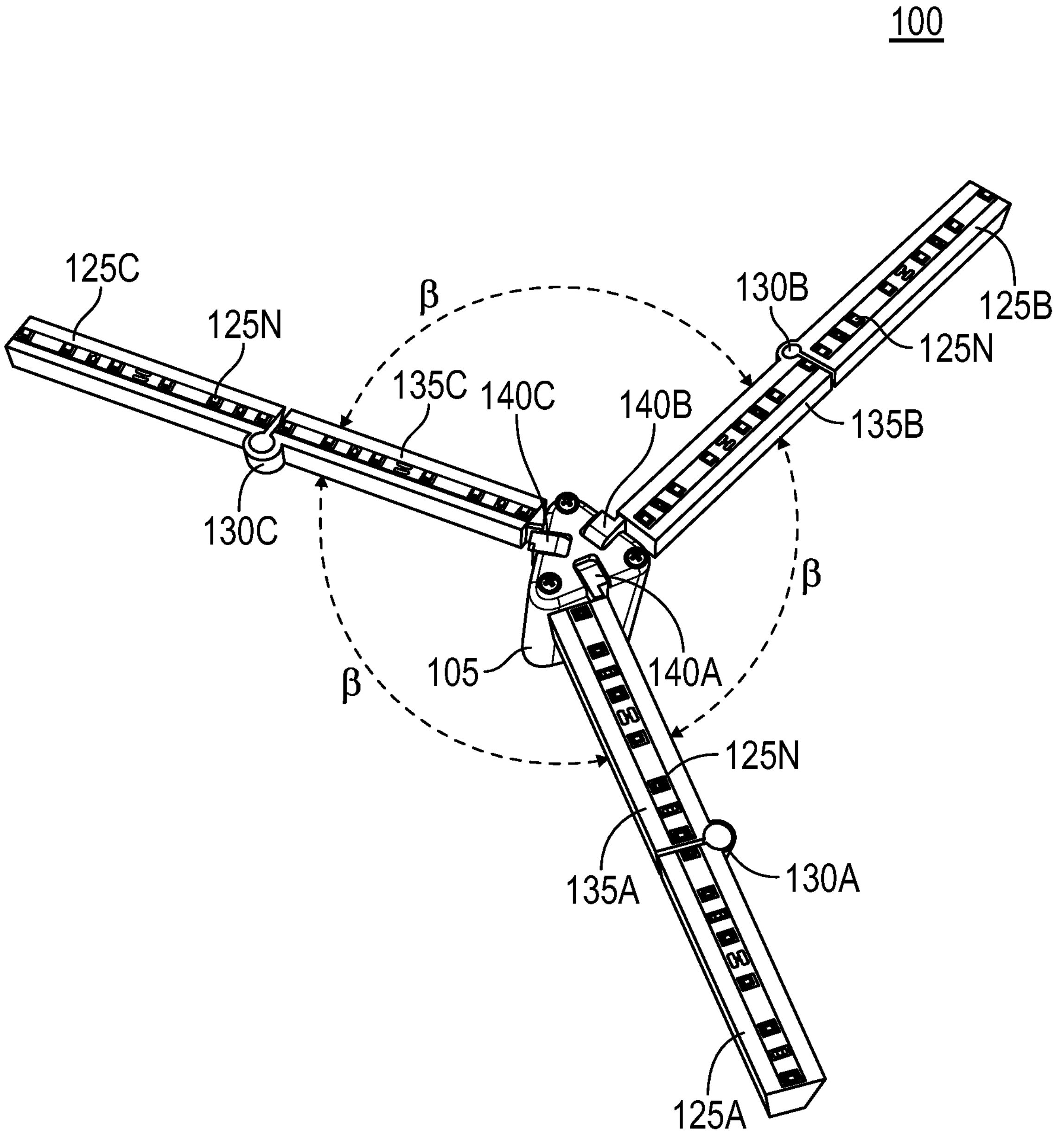
FIG. 5 illustrates a perspective view of a light device with a plurality of light arms extended into a second position.

FIG. 5 illustrates a perspective view of a light device 100 with a plurality of light arms extended into a second position. Light device 100 includes a housing 105 and one or more control switch 110A-B. As shown in FIG. 5, each one of light arms 125A-125C have ben rotated down by hinges 140A-140C, respectively, at an angle α, shown in FIG. 3. Light arms 125A-125C are disposed in plane horizontal to a length of housing 105 at an angle, β, from each other which may be subject to the number of light arms implemented by light device 100. For example, with three light arms, light arms 125A-125C angle β may be 120 degrees. In an implementation with two light arms, angle β may be 180 degrees. In an implementation with four light arms, angle β may be 90 degrees. Other implementations are possible which will alter corresponding angle β between light arms.

First light arm 125A may include a hinge 130A and a first light arm extension 135A. Both first light arm 125A and first light arm extension 135A may include a plurality of light emitting diodes ("LEDs") 125N which emit light along a length of first light arm 125A and first light arm extension 135A. As shown in FIG. 5, first light arm 125A is in a second position by articulation of extension hinge 130A. First light arm 125A may be articulated by extension hinge 130A to align with first light arm extension 135A to provide light over a larger area than if first light arm 125A was not articulated by hinge 130A. In this manner, a length of a light among the plurality of light arms 125A-125C is doubled disposed next to first light arm 125A to provide more intense light over a larger area arm (e.g., a length of light arm 125A is effectively doubled by rotating light arm 125A into alignment with first light extension 135A to create a single extended light arm).

Second light arm 125B may include a hinge 130B and a second light arm extension 135B. Both second light arm 125B and second light arm extension 135B may include a plurality of light elements (light emitting diodes ("LEDs")) 125N which emit light along a length of second light arm 125B and second light arm extension 135B. As shown in FIG. 5, second light arm 125B is in a second position by articulation of extension hinge 130B. Second light arm 125B may be articulated by extension hinge 130B to align with second light arm extension 135B to provide light over a larger area than if second light arm 125B was not articulated by hinge 130B. In this manner, a length of a light arm among the plurality of extended light arms 125A-125C is doubled when disposed in alignment with second light arm 135B to provide more intense light over a larger area (e.g., a length of light arm 125B is effectively doubled by rotating light arm 125B into alignment with second light extension 135A to create an extended light arm).

Third light arm 125C may include a hinge 130C and a third light arm extension 135C. Both third light arm 125C and third light arm extension 135C may include a plurality of light emitting diodes ("LEDs") 125N which emit light along a length of third light arm 125C and third light arm extension 135C. As shown in FIG. 5, third light arm 125C is in a second position by articulation of extension hinge 130C. Second light arm 125C may be articulated by extension hinge 130C to align with third light arm extension 135C to provide light over a larger area than if third light arm 125C was not articulated by hinge 130C. In this manner, a length of a light arm among the plurality of extended light arms 125A-125C is doubled when disposed in alignment with third light arm 135C to provide more intense light over a larger area e.g., a length of light arm 125C is effectively doubled by rotating light arm 125C into alignment with third light extension 135C to create an extended light arm).

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A light device, comprising, a housing;

a plurality of light arms, each light arm in the plurality of light arms including a first portion of each light arm and a second portion of each light arm, wherein when the plurality of light arms are disposed vertically from the housing, each second portion of each light arm is disposed between a first portion of the same light arm and a first portion of an adjoining light arm among the plurality of light arms, and each light arm in the plurality of light arms contacts each other light arm in the plurality of light arms when the plurality of light arms are disposed vertically;

a rotation hinge connected between the housing and each of the first portion of the light arm in the plurality of light arms, the rotation hinge rotating a corresponding one of the plurality of light arms from vertical disposition in a first plane; and an extension hinge which connects each first portion of the light arm in the plurality of light arms to the second portion of the light arm in the plurality of light arms on a side of each first portion of the light arm, among the plurality of light arms, which is opposite to a side of each first portion of the light arm that is connected to the housing by the rotation hinge, wherein the extension hinge permits only each second portion of each light arm in the plurality of light arms to rotate in a second plane and prevents each first portion of the light arm in the plurality of light arms from rotating in the second plane, wherein the second plane is a plane that is different from the first plane, and the extension hinge permits only each second portion of the light arm in the plurality of light arms to move between a first position that is aside the first portion of the light arm and a second position that is in a straight line with the first portion of the light arm.

2. The light device of claim 1, further comprising: a plurality of light elements disposed on each first portion of each light arm in the plurality of light arms and each second portion of each light arm such that the light elements emit light in the same direction whether the second portion of the light arm is aside the first portion of the light arm or the second portion of the light arm is aligned with the first portion of the light arm.

3. The light device of claim 1, wherein each rotation hinge connected between the housing and the plurality of light arms allow the plurality of light arms to rotate to an angle β between each one of the plurality of light arms.

4. The light device of claim 1, further comprising a light control switch.

5. The light device of claim 4, wherein the light control switch is a power switch.

6. The light device of claim 4, wherein the light control switch is a dimmer switch.

7. The light device of claim 1, further comprising connection circuitry.

8. The light device of claim 7, wherein the connection circuitry provides a port for accepting a wire.

9. The light device of claim 7, wherein the connection circuitry is wireless connection circuitry which receives wireless operation instructions for the light device.

10. The light device of claim 1, further comprising a power switch and a dimmer switch.

11. The light device of claim 10, wherein the power switch and the dimmer switch are disposed in the housing of the light device.

12. The light device of claim 1, wherein the housing further includes a mount.

13. The light device of claim 1, wherein mount is a threaded mount.

14. The light device of claim 1 further comprising, a battery disposed within the housing.

* * * * *